July 30, 1957 R. W. SONNENFELDT 2,801,282

OSCILLATOR SYNCHRONIZING CIRCUIT

Filed Nov. 30, 1951

INVENTOR
RICHARD W. SONNENFELDT
BY
ATTORNEY

United States Patent Office 2,801,282

Patented July 30, 1957

2,801,282

OSCILLATOR SYNCHRONIZING CIRCUIT

Richard W. Sonnenfeldt, Haddonfield, N. J., assignor to Radio Corporation of America, a corporation of Delaware Application November 30, 1951, Serial No. 259,198

4 Claims. (Cl. 178—69.5)

This invention relates to apparatus for synchronizing the phase and frequency of a remotely located oscillator.

It is sometimes convenient to employ bursts of alternating current energy to synchronize a remotely located oscillator. For example, in some color television systems, the color information is represented by the phase and amplitude of a color carrier. The color carrier is derived at a transmitter by modulating each of variously phased components of a voltage wave of the color carrier frequency with different color information. At the receiver the color information can be abstracted by modulating the color carrier with unmodulated alternating current waves that correspond in phase and frequency to the variously phased voltage waves of the color carrier frequency at the transmitter. This requires that the source of unmodulated voltage waves of color carrier frequency at the receiver be synchronized with the source of the color carrier at the transmitter. This could be effected by employing other transmission channels, but more economical use is made of the available frequency spectrum by transmitting a burst of the desired color carrier frequency during horizontal blanking time as has been previously suggested.

The object of the present invention is to provide an improved means whereby this synchronization can be accomplished.

Briefly, the manner in which the present invention operates is as follows: the bursts of synchronizing information are injected into the tank circuit of the oscillator that provides the unmodulated waves of color carrier frequency at the receiver. The output circuit at the oscillator is designed so as to present a low impedance at the frequency of the burst itself and a high impedance to the frequency of the envelope of the bursts or in other words to the burst repetition frequency. If the bursts injected into the tank circuit are in phase with the oscillations present therein, less power is drawn from the oscillator tube and the oscillator plate voltage increases. On the other hand, if the injected burst is 180° out of phase with the oscillations in the tank circuit, the amplifier of the oscillator must supply more energy and accordingly its plate voltage decreases. Means are provided for employing this change in the plate voltage of the oscillator so as to control a reactance tube that is coupled to the tank circuit. The manner in which the present invention operates may be better understood from a detailed consideration of the drawings in which:

The entire transmitted signal is detected by a suitable receiver 2 and its output is supplied to a standard sync separator 4. The horizontal sync pulses supplied by the sync separator 4 are applied to a unistable multivibrator 6 in such manner that the multivibrator is triggered to its unstable state by the trailing edge of the horizontal sync pulse. The multivibrator may be adjusted to revert to its stable position during the horizontal blanking period. The pulses supplied by the multivibrator 6 therefore may be made to recur during the same time as the burst of synchronizing energy that is transmitted during the horizontal blanking interval. The whole signal that is detected by the receiver 2 is applied to a gate 8. The pulses supplied by the multivibrator are also applied to the gate and serve to render it capable of passing signals only when the burst of synchronizing energy is present at the output of the receiver.

Figure 2:
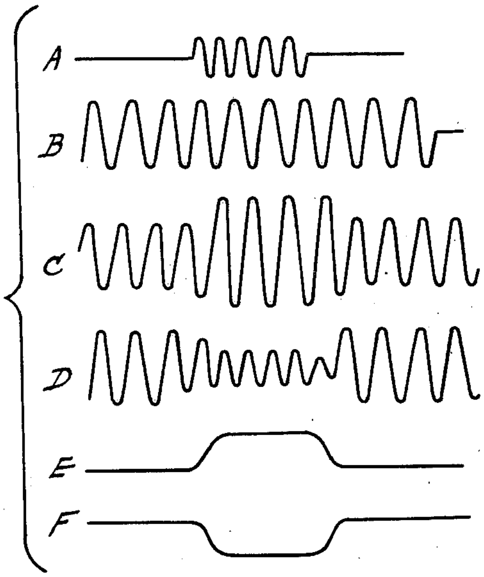
Figure 2 illustrates waves that are useful in explaining the operation of the apparatus shown in Figure 1.

The burst of synchronizing energy 10 that is thus supplied by the gate 8 is coupled to the top of a tank circuit 12 via a coupling condenser 14. The top of the tank circuit 12 is coupled to a grid 16 of an oscillator amplifier 18 via a condenser 20 and a grid leak resistor 22. The time constant of the condenser 20 and the resistor 22 with respect to the frequency of the oscillator is such that the oscillator amplifier 18 operates in class "C." The cathode 24 of the oscillator amplifier 18 is connected to a mid point of the tank circuit 12 and D. C. returned to ground via the choke 83. The plate 26 of the oscillator amplifier 18 is coupled to B+ via a load resistor 28 and a condenser 30. The size of the condenser 30 is sufficient to bypass the frequency of the oscillator around the load resistor 28. If, as is well known to those skilled in the art, the burst 10 is in phase with the oscillations taking place in the tank circuit 12, the oscillator amplifier 18 need not supply as much energy as it would otherwise have to in order to maintain oscillations, and accordingly, the voltage of the plate 26 increases. This increase in voltage can be built up across the output circuit of the oscillator that is comprised of a condenser 30 and the resistor 28 because the time constants of these components is short in comparison with the recurrence frequency of the burst 10. On the other hand, if the bursts 10 are out of phase with the oscillations present in the tank circuit 12, the oscillator amplifier 18 must supply more energy and accordingly the voltage of the plate 26 decreases. These facts are illustrated by the waves shown in Figure 2. The wave "A" represents the burst 10 that is injected at line frequency into the tank circuit 12 on the oscillator. The wave "B" represents the output of the oscillator when no bursts are applied to it. The wave "C" indicates the variations in oscillation frequency amplitude when the burst 10, as illustrated by the wave "A," is in phase with the oscillation in the tank circuit illustrated by the wave "B." It will be noted that the reinforcing action of the burst causes the amplitude across the tank circuit to increase. This increase in oscillator tank voltage means that the oscillator amplifier 18 need not supply as much energy and accordingly the voltage of the plate 26 increases in amplitude during the burst interval as indicated by the wave "E." The wave "D" illustrates the decrease in amplitude of the tank circuit oscillation produced when the burst 10 is out of phase with oscillations in the tank circuit. The wave "F" shows that under the latter conditions the voltage of the plate 26 decreases in amplitude as the energy supplied by the oscillator amplifier 18 increases.

The plate 26 of the oscillator amplifier 18 is coupled to a peak detecting circuit 32. The time constants of the peak detecting circuit are adjusted so that the output of the circuit follows the peaks of the pulses illustrated by waves "E" and "F" of Figure 2. In other words, the output of the peak detecting circuit is able to respond to voltage variations of line frequency. Although different types of peak detecting circuits may be employed, the present one has been found highly satisfactory. The plate 26 is coupled to ground via a coupling condenser 34 and a resistor 36. The junction between these two components is connected to the plate 38 of a diode 40. The cathode 42 of the diode is coupled to an input terminal 43 of a filter 44. The filter 44 may be comprised of a condenser 46 connected between the input terminal 43 of the filter 44 and ground. A resistor 50 is coupled between the input terminal 48 of the filter and an output terminal 52. The output terminal 52 is coupled to ground via a condenser 54. Therefore, when the injected burst 10 is in phase with the oscillations taking place in the tank circuit 12, the plate 26 goes positive and the condensers 46 and 54 of the filter 44 are charged positively by the conduction of the diode 40.

The plate 26 of the oscillator amplifier 18 is also coupled to ground via a condenser 58 and a resistor 60. The junction between the condenser and resistor is connected to a cathode 62 of a diode 64. The plate 66 of the diode is connected to the input terminal 43 of the filter 44. Therefore, when the burst 10 is out of phase with the oscillations taking place in the tank circuit 12, the voltage of the plate 26 decreases as indicated by the wave "F" of Figure 2 and accordingly the condensers 40 and 54 are charged negatively by the conduction of the diode 64.

If the burst 10 is plus or minus 90° with respect to the oscillations taking place in the tank circuit 12, neither of the diodes 40 and 64 conducts and accordingly the output terminal of the filter 44 remains at ground potential. The output terminal 52 of the filter 44 is coupled to a grid 68 of a reactance tube 70. The reactance tube is effectively coupled into parallel relationship with a tank circuit 12 via condenser 73 that is connected between its plate and the top of the tank circuit 12. The cathode 74 of the reactance tube 70 is coupled to ground via a parallel resistor and condenser 76 and 78. The plate 80 of the reactance tube 70 is coupled to B+ via an inductance 82, preferably a choke. A condenser 75 is connected between the plate 80 and the control grid 68 of the reactance tube 70 to provide a reactive component at the control grid of reactance tube 70 in accordance with well known principles of reactance tube operation. The condenser 75 represents both the interelectrode capacitance of reactance tube 70 between the control grid 68 and the plate 80 and any external capacitance which may be added to provide a desired amount of the reactance component at the control grid 68. The grid of the reactance tube is also connected to a potentiometer 72. The voltage of the potentiometer is set so that the combination of the reactance tube 70 and the tank circuit 12 establishes the oscillator frequency at the desired frequency when potential of the output terminal of the filter 44 is ground.

Figure 1:
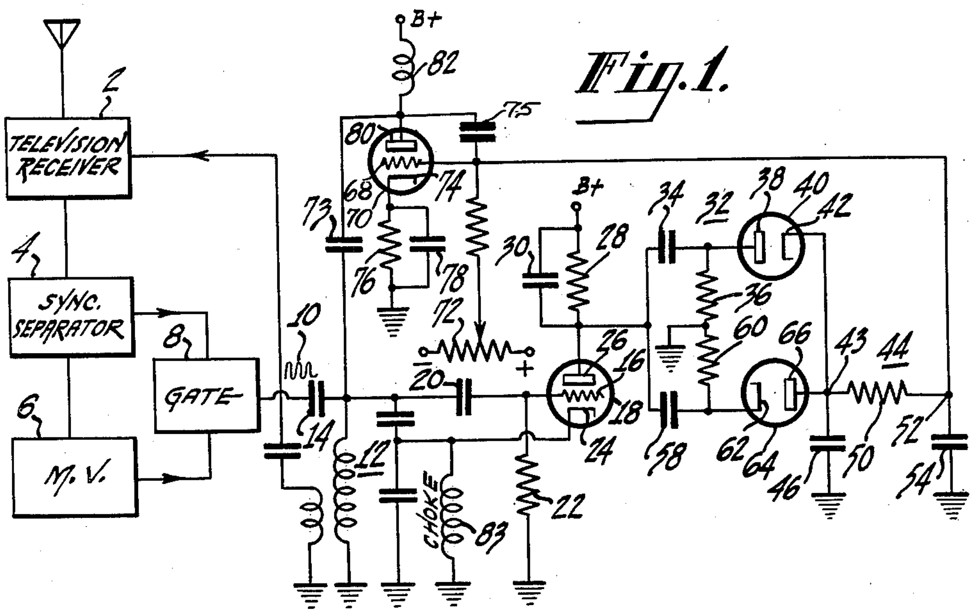
Figure 1 is a schematic of the one embodiment of the present invention.

The overall operation of the apparatus of Figure 1 is as follows. Let us assume that the oscillator leads the burst by 90°. In this condition, the burst neither adds to nor subtracts from the energy introduced into the tank circuit 12 by the oscillator amplifier 18 and accordingly the voltage supplied by the peak detector circuit 32 is zero. It will be remembered that the potentiometer 72 was adjusted so that the oscillator frequency was correct under these conditions. If nothing disturbed the oscillator's phase or frequency, the oscillator would remain 90° ahead of the phase of the burst. That this is an unstable position for the arrangement shown in Figure 1 wherein the reactance tube simulates a variable capacitance can be seen by assuming that some disturbance causes a change in the phase of the oscillator. If it be assumed that this disturbance is such as to advance the phase of the oscillator so that it leads the burst by more than 90° it can be seen that the burst has a component that is 180° out of phase with the oscillator. This component therefore effectively cancels some of this energy introduced into the tank circuit by the oscillator amplifier 18. For reasons given above, this causes the voltage at the plate 26 of the oscillator to decrease. When the negative voltage is applied to the grid of the reactance tube 70, less current flows through the reactance tube. Thus the reactance tube simulates a small capacitance and accordingly the frequency of the oscillator is increased. This increase in frequency advances the phase of the oscillator at a faster rate and consequently the voltage supplied to the reactance tube by the peak detector 32 decreases still further and the oscillator speeds up some more. When the oscillator reaches a point that is 180° out of phase with the burst, it is operating at a higher frequency than the burst and therefore its phase gains with respect to the burst. After it passes through the 180° point however, the voltage supplied by the peak detector increases in a positive direction so as to make the reactance tube draw more current and appear as a larger capacitance. This causes the frequency of the oscillator to decrease. Even though the frequency is decreasing it still gains in phase with respect to the burst until it lags the burst by 90°. At this point the peak detector provides no voltage to the reactance tube. It will be remembered that under this condition the reactance tube oscillator combination is adjusted to operate at the frequency of the burst. This was also true when the oscillator was in advance of the burst by 90° but the difference is that when the oscillator lags the burst by 90° it is in a stable condition. If a disturbance should speed up the oscillator, the bursts add to the energy of the oscillator and so the oscillator amplifier 18 draws less current and its plate voltage increases. For reasons given above, this causes the oscillator to slow down. If the disturbance slows the oscillator down the voltage applied to the reactance tube is reduced and the oscillator speeds up.

If the reactance tube were coupled to the oscillator in such manner as to simulate an inductance, the position of stability would be at a point where the oscillator led the burst by 90°.

In any phase control system of the type described whereby a burst of synchronizing energy is injected into the tank circuit of the oscillator there is a tendency for the oscillator to lock in phase with the burst, and therefore the positions of stability might be such that the phase of the oscillator might be different than 90°. However, if the energy in the burst is small compared to the energy of the oscillator, the points of stability are close to a 90° phase relationship between the oscillator and the burst.

In the arrangement described, the bypassed resistor 28, the peak detector 32 and the filter 44 form a means for deriving a voltage that varies in value in accordance with the phase relationship between the bursts injected into the tank circuit and the energy introduced into the tank circuit by the oscillator.

It will also be understood by those skilled in the art that the burst of synchronizing energy could be separated from the signal train supplied by the receiver 2 by other means than the multivibrator 6. For example, the pulse provided by the horizontal deflection coil during flyback could be used to operate the gate 8.

What is claimed is:

1. Apparatus for synchronizing an oscillator with recurrent bursts of alternating current energy comprising in combination, an oscillator having a tuned circuit, and an output circuit, said output circuit being adapted to build up voltages across it in response to frequencies that are less than the oscillator frequency, a reactance tube coupled to said tuned circuit, a peak detector coupled to said output circuit, means for coupling the output of said peak detector to said reactance tube so as to control its conductivity and means for injecting bursts of alternating current energy having a desired phase and frequency into said tuned circuit.

2. Apparatus for synchronizing the phase and frequency of an oscillator with recurrent bursts of energy of a desired phase and frequency comprising in combination an oscillator having a tank circuit and a plate, means for injecting said bursts into said tank circuit, a source of fixed positive potential, a resistor connected between said plate and said source, a bypass condenser coupled to said plate, a peak detector coupled to said plate, a reactance tube, said reactance tube being coupled to said oscillator so as to vary its frequency and phase in accordance with the amount of current passing through said reactance tube, and means for coupling the output of said peak detector to said reactance tube so as to control its conductivity.

3. Apparatus for synchronizing the phase and frequency of an oscillator with recurrent bursts of alternating current energy of a desired phase and frequency comprising in combination an oscillator having a tank circuit, means for injecting said bursts into said tank circuit, a reactance tube, said reactance tube being coupled to said oscillator in such manner as to control its phase and frequency in accordance with the current flowing through said reactance tube, means for deriving a voltage that corresponds to the average energy drawn by said oscillator as a consequence of the phase relationship between the bursts and the energy supplied by said oscillator to said tank circuit, and means for applying said voltage to said reactance tube in such manner as to control its conductivity and hence the phase and frequency of said oscillator.

4. In a color television receiver, said color television receiver adapted to receive a color television signal including color information and synchronizing sine wave bursts of oscillations, a free running oscillator circuit, said free running oscillator circuit including a tank circuit, gating means, said gating means utilized to separate said synchronizing sine wave bursts of oscillations from said color television signal, means for injecting said separated synchronizing sine wave bursts of oscillations into said tank circuit of said free running oscillator circuit, means to derive from said oscillator circuit a control voltage which is indicative of the phase relationship between said bursts of oscillations and free-running oscillations provided therein by said oscillator circuit, and means responsive to said control voltage and coupled to said oscillator circuit for controlling the frequency and phase of said free-running oscillations developed by said oscillator circuit.

References Cited in the file of this patent

UNITED STATES PATENTS

| | | |
|---|---|---|
| 2,479,081 | Poch | Aug. 16, 1949 |
| 2,585,930 | Gruen | Feb. 19, 1952 |
| 2,617,037 | Hugenholtz | Nov. 4, 1952 |
| 2,740,046 | Tellier | Mar. 27, 1956 |